United States Patent
Morita

[11] Patent Number: 6,021,264
[45] Date of Patent: Feb. 1, 2000

[54] DATA PROCESSING SYSTEM CAPABLE OF AVOIDING COLLISION BETWEEN READ DATA AND WRITE DATA

[75] Inventor: Hiroshi Morita, Tokyo, Japan

[73] Assignee: NEC Corporation, Tokyo, Japan

[21] Appl. No.: 08/719,271

[22] Filed: Sep. 24, 1996

Related U.S. Application Data

[63] Continuation of application No. 08/636,852, Apr. 23, 1996, abandoned, which is a continuation of application No. 08/280,326, Jul. 25, 1994, abandoned.

[30] Foreign Application Priority Data

Jul. 23, 1993 [JP] Japan ................................. 5-182955

[51] Int. Cl.[7] ........................................................ G06F 1/04
[52] U.S. Cl. ........................................ 395/297; 395/552
[58] Field of Search .................................. 395/285, 297, 395/298, 551, 552, 559

[56] References Cited

U.S. PATENT DOCUMENTS

| | | | |
|---|---|---|---|
| 3,984,812 | 10/1976 | Dahlberg et al. | 340/172.5 |
| 4,476,401 | 10/1984 | Lin | 307/269 |
| 4,841,488 | 6/1989 | Sanada | 365/233 |
| 5,014,245 | 5/1991 | Muroka et al. | 365/194 |
| 5,313,422 | 5/1994 | Houston | 365/194 |
| 5,371,880 | 12/1994 | Bhattacharya | 395/551 |
| 5,388,250 | 2/1995 | Lewis et al. | 395/878 |
| 5,469,547 | 11/1995 | Pawlowski | 395/285 |
| 5,537,557 | 7/1996 | Briffett et al. | 395/309 |
| 5,574,866 | 11/1996 | Smith et al. | 395/285 |

FOREIGN PATENT DOCUMENTS

3-37544  4/1991  Japan ............................. G06F 13/42

*Primary Examiner*—Thomas C. Lee
*Assistant Examiner*—St.-John Courtenay, III
*Attorney, Agent, or Firm*—Foley & Lardner

[57] ABSTRACT

In a data processing system, when a write mode register stores a delay information, a write data output signal generation unit delays an output start timing of write data by a predetermined time length, so that even if a just preceding read data exists on a data bus, the write data is outputted to the data bus after the just preceding read data has disappeared from the data bus. A write strobe signal generation unit makes an output timing of a write strobe signal in time with the output timing of the write data. Thus, it is possible to avoid collision between read data and write data without providing a special collision preventing buffer on the a data bus and without inserting a halt condition between a read cycle and a write cycle.

2 Claims, 13 Drawing Sheets

DATA PROCESSING SYSTEM CAPABLE OF AVOIDING COLLISION BETWEEN READ DATA AND WRITE DATA

This application is a continuation of application Ser. No. 08/636,852, filed Apr. 23, 1996 now abandoned, which is a continuation of Ser. No. 08/280,326, filed Jul. 25, 1994 now abandoned.

BACKGROUND OF THE INVENTION

1. Field of the Invention

The present invention relates to a data processing system, and more specifically a data processing system capable of avoiding collision between read data and write data.

2. Description of Related Art

After a data processing system has read data from a memory or an input/output device through a data bus, if the data processing system starts a write cycle so as to output write data to the data bus, a collision occurs on the data bus between the read data outputted from the memory or the input/output device and the write data outputted from the data processing system, because a turn-off ready time of the memory or the input/output device is large.

In the prior art, in order to avoid this collision of data, a bi-directional buffer has been provided on the data bus between the data processing system and the memory or the input/output device, for the purpose of controlling the direction of the data bus (this will be called a "first prior art" hereinafter).

In addition, Japanese Utility Model Application Laid-open Publication No. Heisei 3-037544 has proposed to provide a control means receiving a device selection signal and a read/write signal generated by the data processing system, so as to generate a halt signal (data processor wait signal) to the data processing system, so that a halt condition is inserted after completion of the read cycle, whereby the data collision as mentioned above can be avoided (this will be called a "second prior art" hereinafter).

Now, the "first prior art" will be described with reference to the block diagram of FIG. 1 and the timing chart of FIG. 2.

Figure 1:
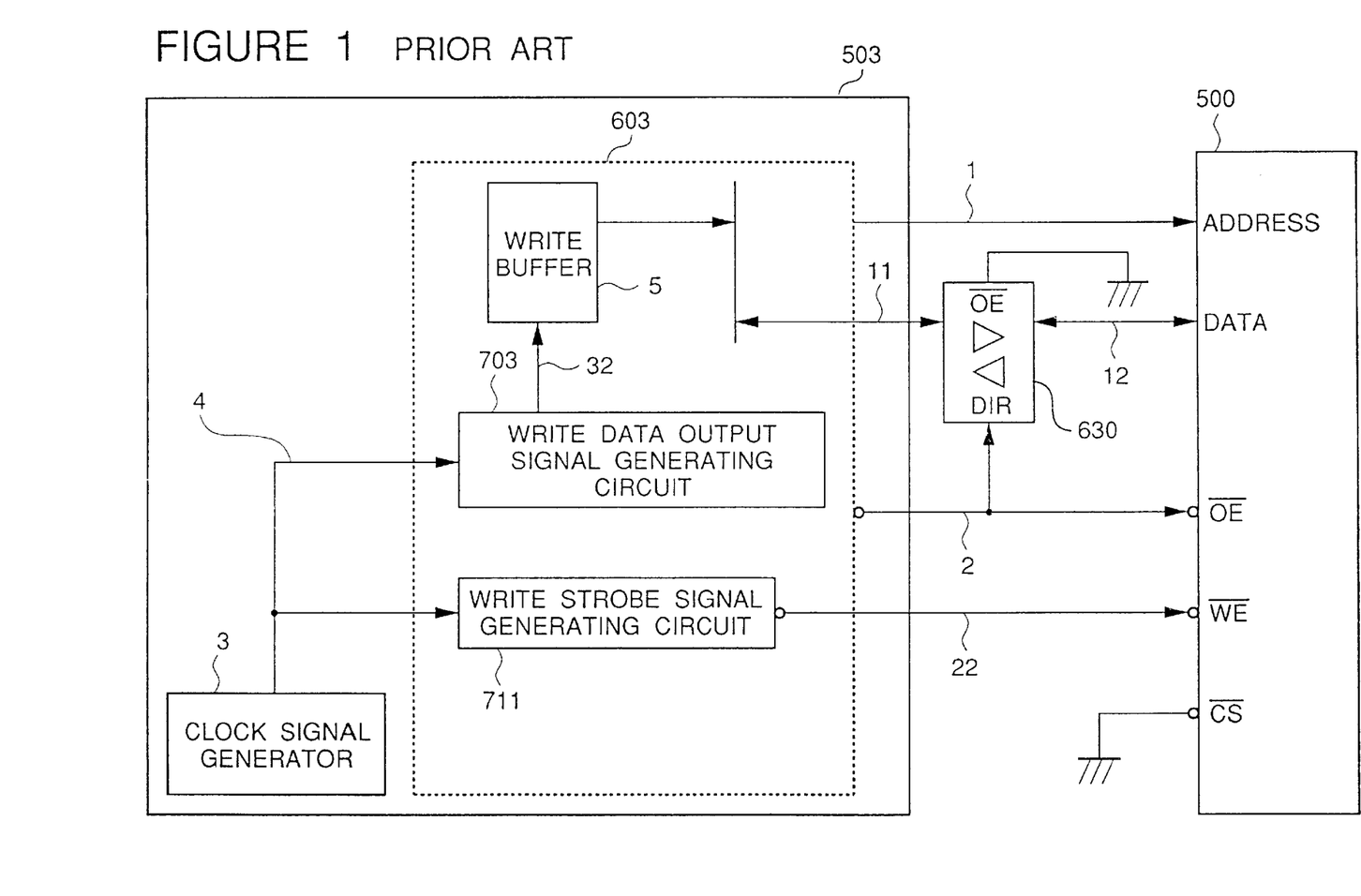
FIG. 1 is a block diagram of a conventional data processing system provided with a mean for avoiding collision between the read data and the write data.

A data processing system, generally designated by Reference Numeral 503 in FIG. 1, comprises a bus interface 603 and a clock generator 3 for supplying a clock signal 4 to the bus interface 603. The data processing system 503 is coupled through an address bus 1 to a memory 500, and also through a data processor side data bus 11 to a bi-directional buffer 630, which is also coupled through a memory side data bus 12 to the memory 500. In addition, the data processing system 503 is configured to supply a read strobe signal 2 to the bi-directional buffer 630 and the memory 500, and also to supply a write strobe signal 22 to the memory 500.

The bus interface 603 of the data processing system 503 includes a write buffer 5, a write data output signal generating circuit 703 and a write strobe signal generating circuit 711. The write buffer 5 is configured to output write data to the data processor side data bus 11 during a period in which a write data output signal 32 generated in the write data output signal generating circuit 703 is active. The write data output signal generating circuit 703 receives the clock signal 4 from the clock signal generator 3 and generates the write data output signal 32 to the write buffer 5. The write strobe signal generating circuit 711 receives the clock signal 4 from the clock signal generator 3 and generates the write strobe signal 22.

The bi-directional buffer 630 controls the direction of the data bus on the basis of the read strobe signal 2. When the read strobe signal 2 is active, the bi-directional buffer 630 outputs the date on the memory side data bus 12 to the data processor side data bus 11. When the read strobe signal 2 is inactive, the bidirectional buffer 630 outputs the data on the data processor side data bus 11 to the memory side data bus 12.

Now, operation of the "first prior art" shown in FIG. 1 will be explained with reference to FIG. 2.

When the data processing system 503 starts the read cycle, the bus interface 603 outputs the read address to the address bus 1, and activates the read strobe signal 2. With this, read data is outputted from the memory 500 to the memory side data bus 12. Since the read strobe signal 2 is active, the read data is outputted from the bi-directional buffer 630 to the data processor side data bus 11, and is sampled to the data processing system at a rising edge of the read strobe signal 2.

On the other hand, when the data processing system 503 starts the write cycle, the bus interface 603 outputs the write address to the address bus 1, and the write strobe signal generating circuit 711 activates the write strobe signal 22. In addition, the write data output signal generating circuit activates the write data output signal 32, and the write buffer 5 outputs the write data to the data processor side data bus 11 for a period in which the write data output signal 32 is active. Since the read strobe signal 2 is inactive, the write data is outputted through the bi-directional buffer 630 to the memory side data bus 12, and is written into the memory at a rising edge of the write strobe signal 22.

Figure 2:
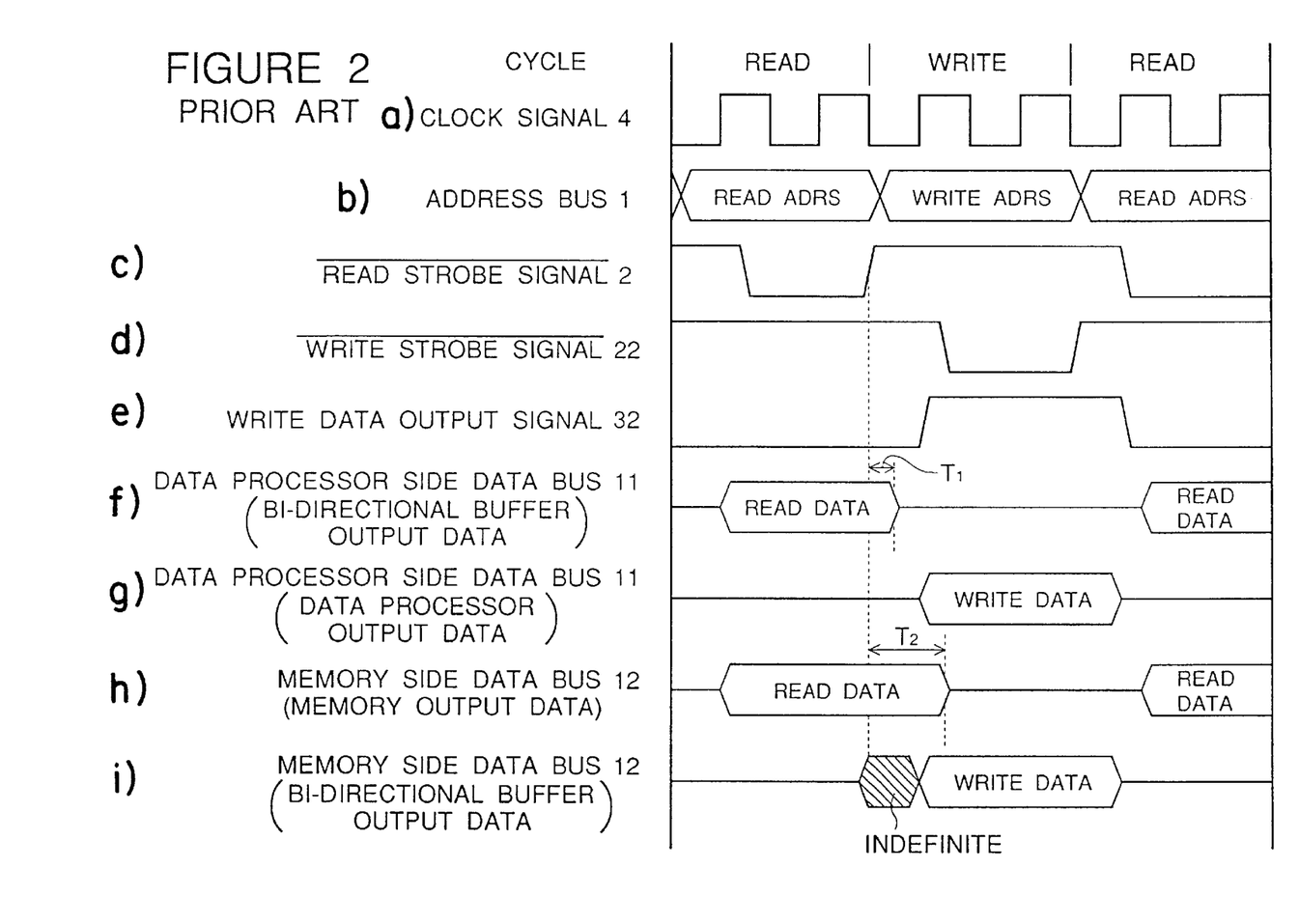
FIG. 2 is a timing chart illustrating operation of the system shown in FIG. 1.

The externally provided bi-directional buffer 630 is ordinarily constituted of a TTL circuit, and a turn-off ready time $T_1$ of the externally provided bi-directional buffer 630 is shorter than a turn-off ready time $T_2$ of the memory 500, as shown in FIG. 2. Therefore, it is possible to avoid the collision of data on the data processor side data bus 11. In addition, the write data output signal 32 and the write strobe signal 22 are outputted at substantially the same timing, and it is not possible to change the output timing of these signals.

In the "first prior art" as mentioned above, however, the collision of data occurs on the memory side data bus (in the period $T_2$ in FIG. 2). In addition, the extra bi-directional buffer 630 is required.

On the other hand, the "second prior art" is disadvantageous, since the halt condition is inserted after completion of the read cycle, and thus a next cycle is delayed by a time period necessary for the halt condition.

SUMMARY OF THE INVENTION

Accordingly, it is an object of the present invention to provide a data processing system which has overcome the above mentioned defect of the conventional ones.

Another object of the present invention is to provide a data processing system capable of avoiding collision between read data and write data, without providing an external circuit on the way of a data bus, and without inserting a halt condition between a read cycle and a write cycle.

The above and other objects of the present invention are achieved in accordance with the present invention by a data processing system timed with a clock signal to supply an address signal through an address bus to an external device (such as a memory or an input/output device), and to read data through a data bus from an address of the external device designated by the address signal and to write data through the data bus to an address of the external device designated by the address signal, the data processing system including a timing adjusting means for delaying a timing starting to output write data to the data bus, by a predetermined time length, so that the write data is outputted to the data bus after a just preceding read data has disappeared from the data bus, the timing adjusting means activating a write strobe signal in time with the delayed output timing of the write data.

According to another aspect of the present invention, there is provided a data processing system comprising:

a data processing unit timed with a clock signal, to supply an address signal through an address bus to a memory, and to supply a read strobe signal to the memory so as to read data through a data bus from an address of the memory designated by the address signal and to supply a write strobe signal to the memory so as to write data through the data bus to an address of the memory designated by the address signal;

delay instruction storing means for storing a delay instruction when there is given the delay instruction for delaying an output timing of write data; and a timing adjusting means, when the delay instruction storing means stores the delay instruction, for delaying a timing starting to output write data to the data bus, by a predetermined time length, so that the write data is outputted to the data bus after a just preceding read data has disappeared from the data bus, the timing adjusting means activating the write strobe signal in time with the delayed output timing of the write data.

In one embodiment of the data processing system, the data processing unit, the delay instruction storing means and the timing adjusting means are preferably constituted together in a single semiconductor device. In addition, the timing adjusting means is configured to terminate the delay of the timing starting to output the write data, in synchronism with a logical level transition of the clock signal.

In a preferred embodiment, the data processing unit includes at least:

a write buffer coupled to the data bus for supplying the write data to the data bus;

a clock generator for generating the clock signal;

a write strobe signal generation unit receiving the clock signal from the clock generator, and to output the write strobe signal at a non-delayed timing when the delay instruction storing means does not store the delay instruction, the write strobe signal generation unit outputting, when the delay instruction storing means stores the delay instruction, the write strobe signal at a delayed timing in time with a logical level transition of the clock signal; and a write data output signal generation unit receiving the clock signal from the clock generator, and for causing the write buffer to output the write data to the data bus at a non-delayed timing when the delay instruction storing means does not store the delay instruction, the write data output signal generation unit causing the write buffer to delay the outputting timing of the write data and to output the write data to the data bus in time with the write strobe signal when the delay instruction storing means stores the delay instruction.

According to a still further aspect of the present invention, there is provided a data processing system comprising:

a data processing unit timed with a clock signal to supply an address signal through an address bus to a memory, and to generate a read strobe signal, a cycle start signal and a read/write signal indicative of whether it is a read cycle or a write cycle, so as to read data through a data bus from an address of the memory designated by the address signal and so as to write data through the data bus to an address of the memory designated by the address signal;

a write enable signal generation unit receiving the cycle start signal, the clock signal and the read/write signal, for generating a write strobe signal and a write enable signal at a delayed timing, so as to ensure that write data in the write cycle is outputted to the data bus after a just preceding read data has disappeared from the data bus, the write strobe signal and the write enable signal being supplied to the memory and the data processing unit, respectively; and an output delay means for delaying a timing starting to output write data to the data bus, into time with the output timing of the write enable signal generated in the write enable signal generation unit.

The above and other objects, features and advantages of the present invention will be apparent from the following description of preferred embodiments of the invention with reference to the accompanying drawings.

DESCRIPTION OF THE PREFERRED EMBODIMENTS

Fist Embodiment

Figure 3:
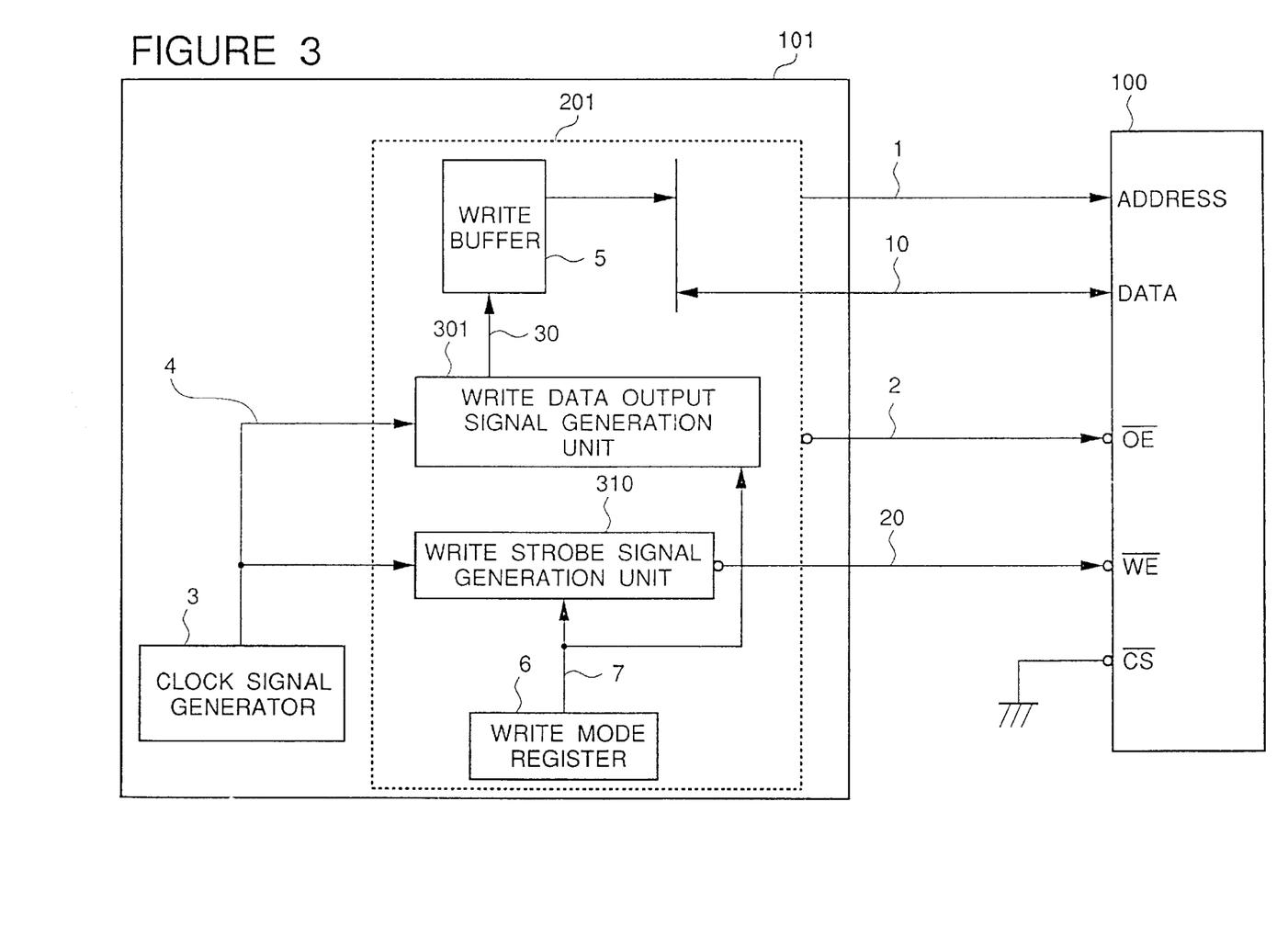
FIG. 3 is a block diagram of a first embodiment of the data processing system in accordance with the present invention.
Figure 4:
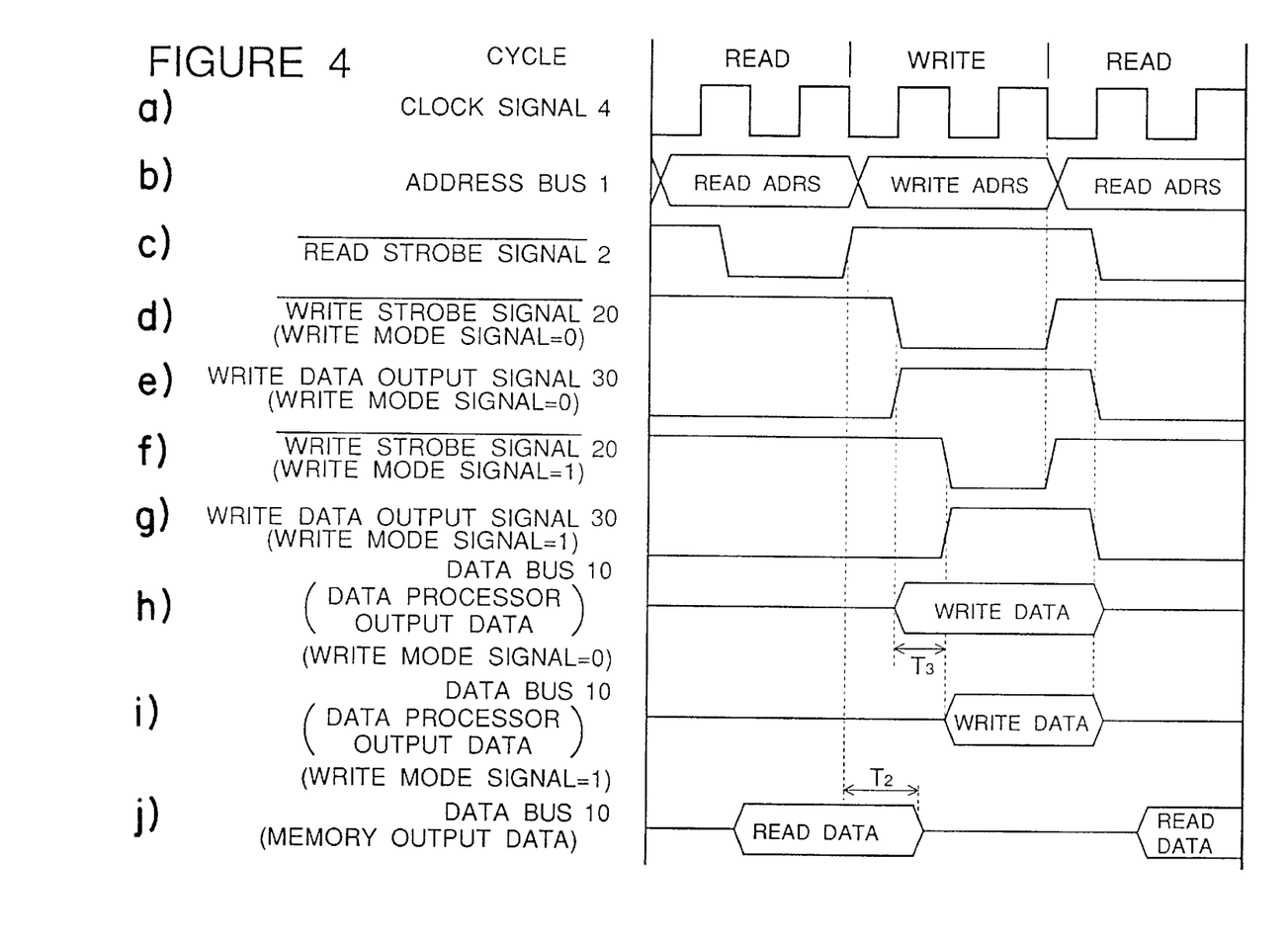
FIG. 4 is a timing chart illustrating operation of the embodiment shown in FIG. 3.
Figure 5:
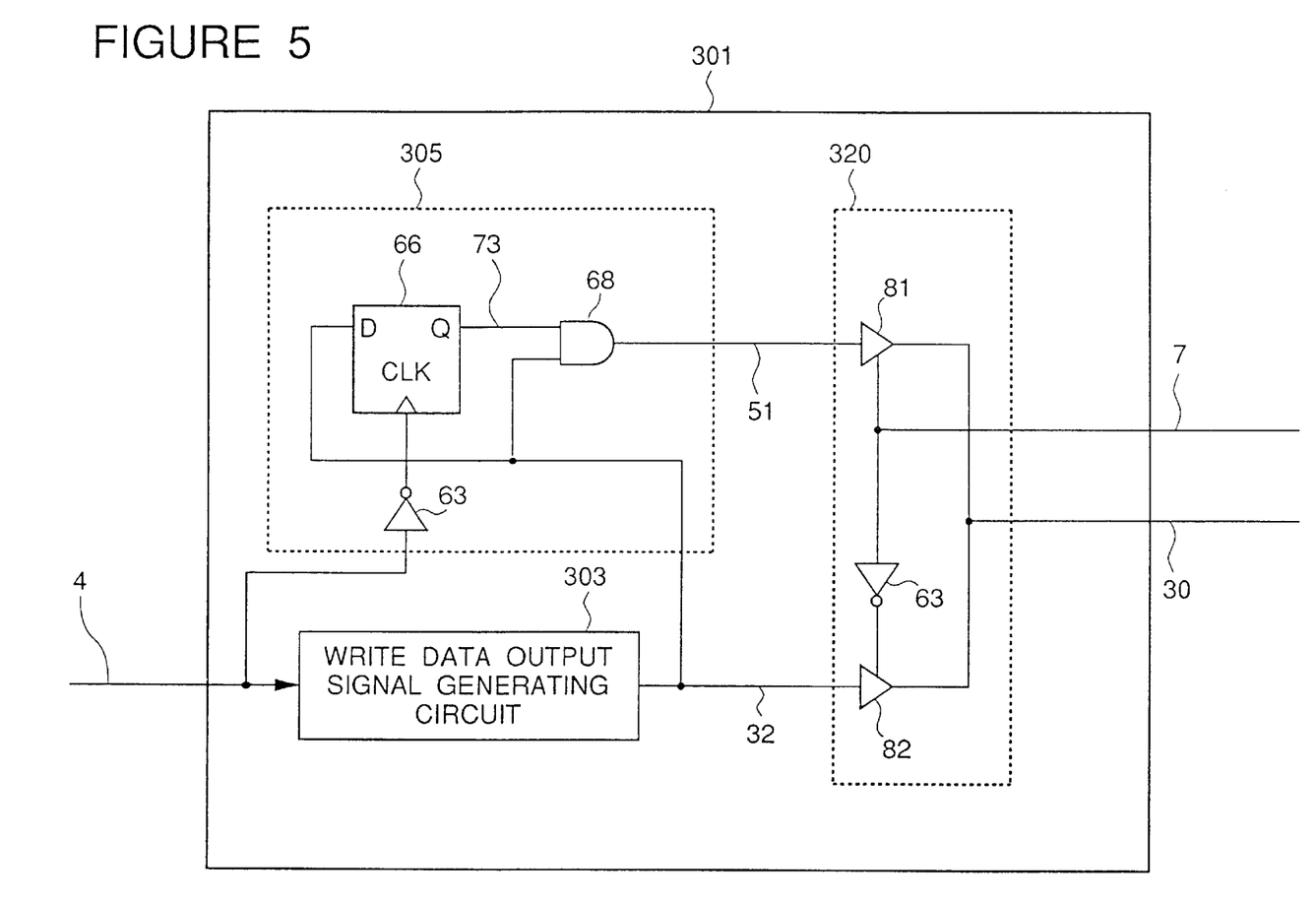
FIG. 5 is a block diagram of the write data output signal generation unit included in the embodiment shown in FIG. 3.
Figure 6:
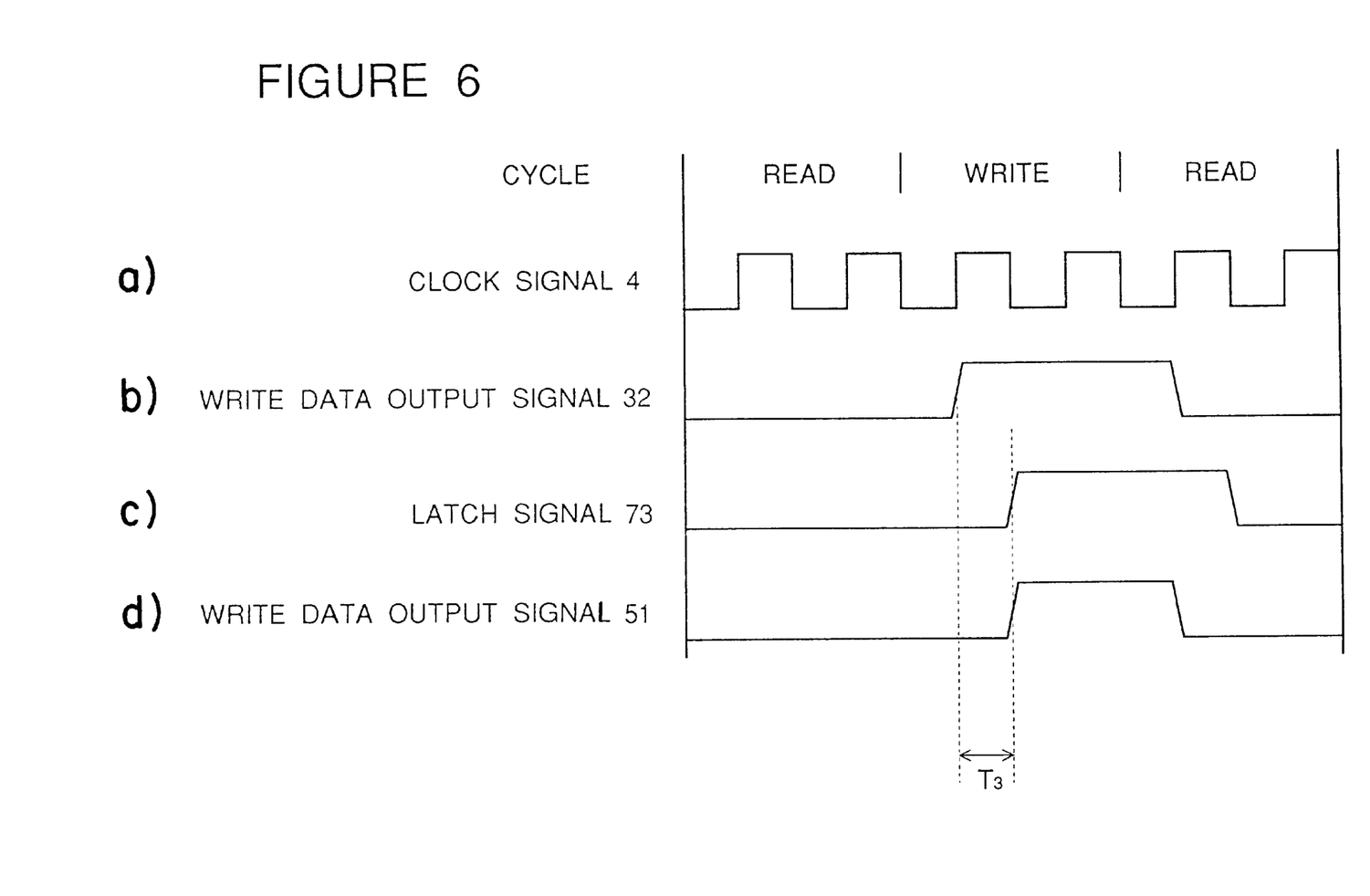
FIG. 6 is a timing chart illustrating operation of the write data output signal generation unit shown in FIG. 5.
Figure 7:
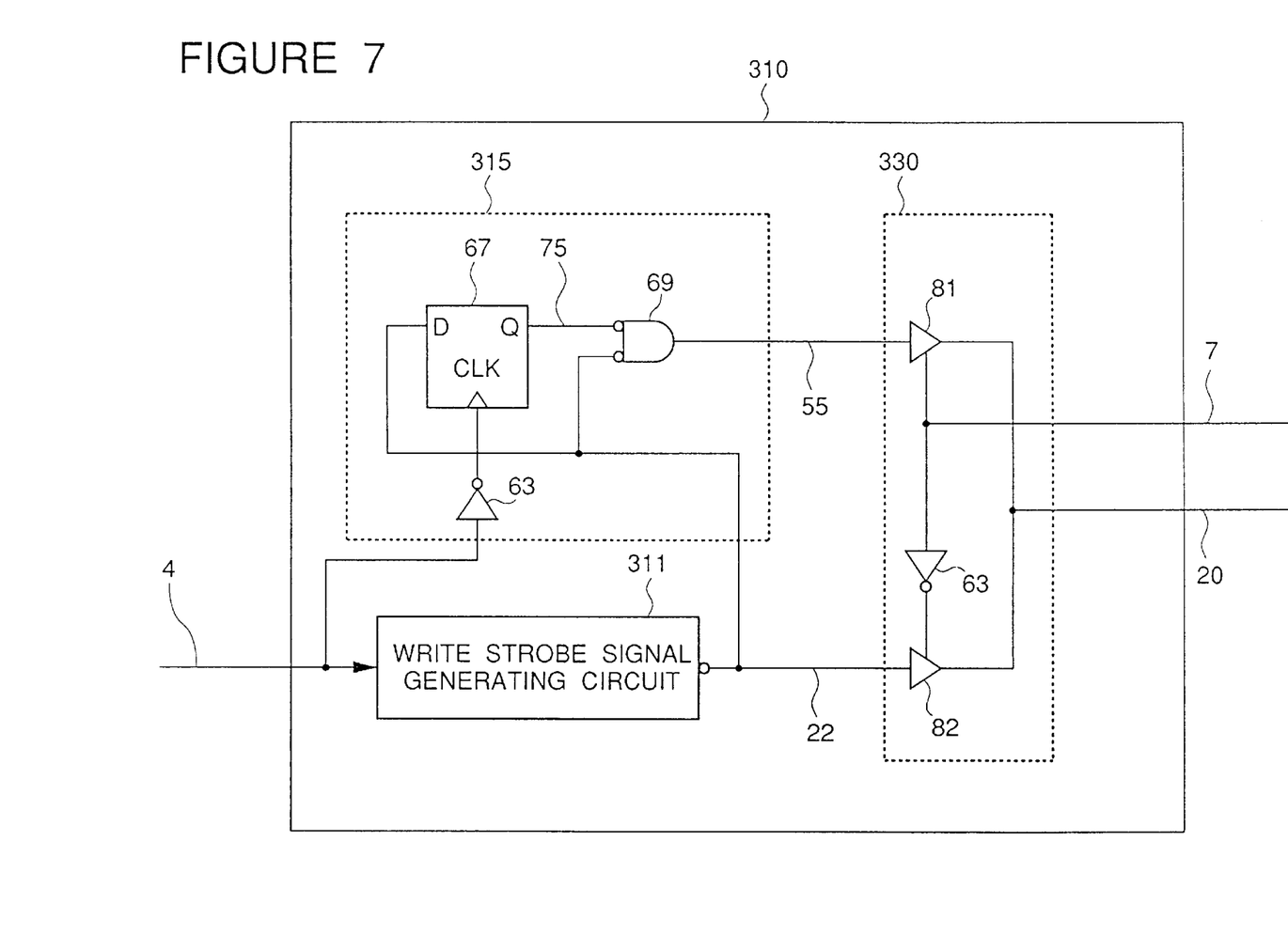
FIG. 7 is a block diagram of the write strobe signal generation unit included in the embodiment shown in FIG. 3.
Figure 8:
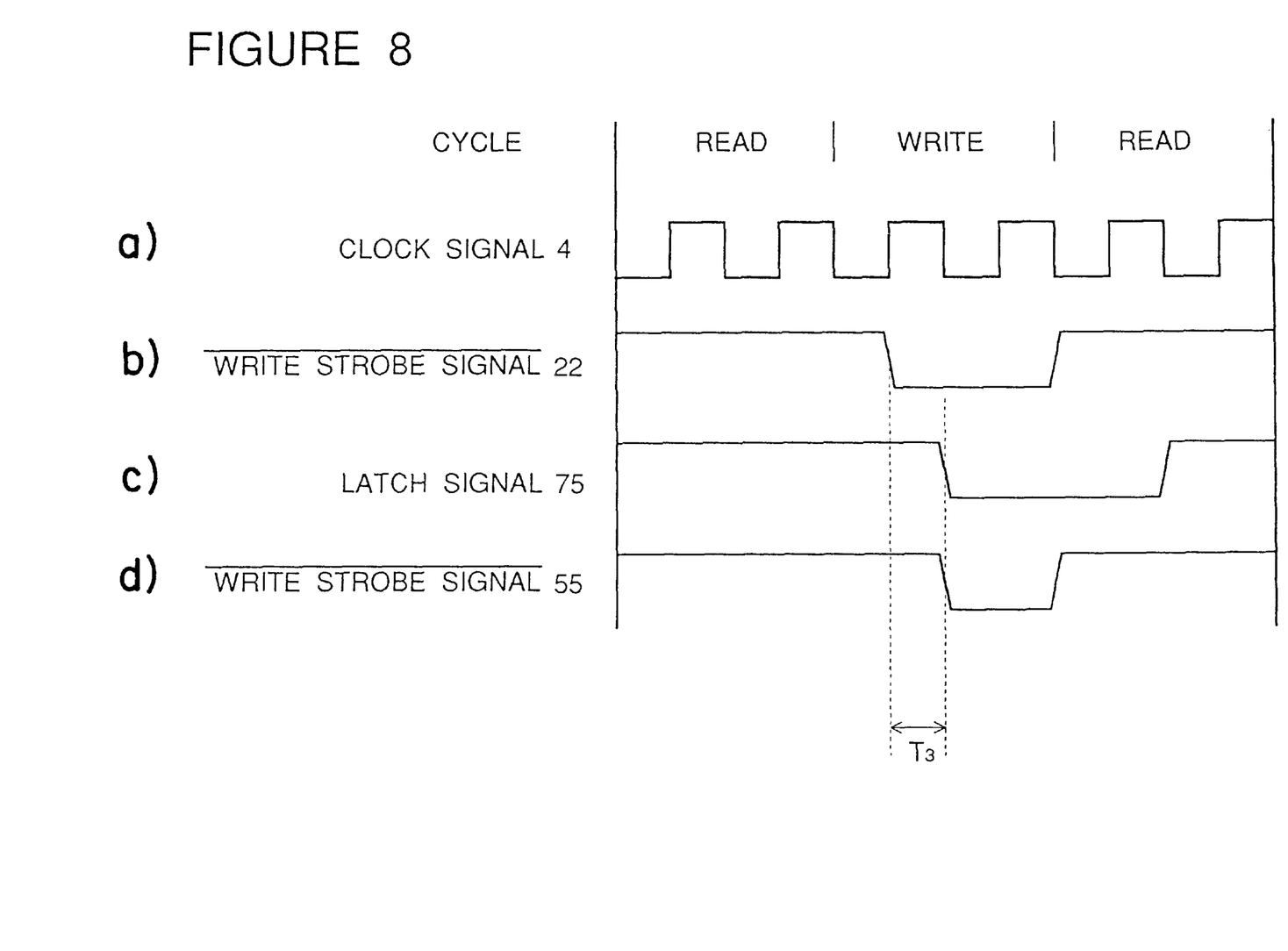
FIG. 8 is a timing chart illustrating operation of the write strobe signal generation unit shown in FIG. 7.

Now, a first embodiment of the data processing system in accordance with the present invention will be explained with reference to FIGS. 3 to 8. FIG. 3 is a block diagram of a first embodiment of the data processing system in accordance with the present invention. FIG. 4 is a timing chart illustrating operation of the embodiment shown in FIG. 3. FIG. 5 is a block diagram of a write data output signal generation unit 301 included in the embodiment shown in FIG. 3. FIG. 6 is a timing chart illustrating operation of the write data output signal generation unit 301 shown in FIG. 5. FIG. 7 is a block diagram of a write strobe signal generation unit 310 included in the embodiment shown in FIG. 3. FIG. 8 is a timing chart illustrating operation of the write strobe signal generation unit shown in FIG. 7.

As shown in FIG. 3, a data processing system, generally designated with Reference Numeral 101, and generally in the form of a single semiconductor device, is used for example as a CPU (central processing unit). The data processing system 101 comprises a bus interface 201 and a clock generator 3 for supplying a clock signal 4 to the bus interface 201. The data processing system 101 is coupled through an address bus 1 and a data bus 10 to a memory 500. In addition, the processing system 101 is configured to supply a read strobe signal 2 and a write strobe signal 20 to the memory 500, for the purpose of accessing the memory 500.

The bus interface 201 of the data processing system 101 includes a write buffer 5, a write mode register 6, a write data output signal generation unit 301 and a write strobe signal generation unit 310. The write buffer 5 is configured to receive write data (for example, data to be written to the memory) from a not-shown circuit within the data processing system, and to output the write data to the data bus 11 during a period in which a write data output signal 30 generated by the write data output signal generation unit 301 is active. The write mode register 6 stores information concerning an output timing of the write data, and outputs a write mode signal 7 to the write data output signal generation unit 301 and the write strobe signal generation unit 310 so as to notify the write data output timing to these circuits 301 and 310.

The write data output signal generation unit 301 receives the clock signal 4 from the clock signal generator 3, and generates the write data output signal 30 at an output timing determined by the value of the write mode signal 7. The write data output signal 30 is supplied to the write buffer 5. The write strobe signal generation unit 310 receives the clock signal 4 from the clock signal generator 3 and generates the write strobe signal 20 at the output timing determined by the value of the write mode signal 7. As will be apparent from the above, the clock signal generator 3 generates the clock signal 4, which is supplied to the write data output signal generation unit 301 and the write strobe signal generation unit 310.

Now, operation of the embodiment will be described with reference to FIG. 4 under an assumption that the write mode register 6 is set to "1" so that the write mode signal 7 is of "1". Incidentally, in the case that the write mode register 6 is set to "0", the data processing system 101 operates similarly to the data processor system 503 of the "first prior art" as mentioned hereinbefore, and therefore, explanation of the operation in the case of the write mode signal 7="0" will be omitted.

When the data processing system 101 starts the read cycle, the bus interface 201 outputs a read address to the address bus 1, and activates the read strobe signal 2, so that read data is outputted from the memory 100 to the data bus 10. The read data is sampled to the data processing system 101 at a rising edge of the read strobe signal 2.

On the other hand, when the data processing system 101 starts the write cycle, the bus interface 201 outputs the write address to the address bus 1. Since the write mode signal 7="1", the write data output signal generation unit 301 activates the write data output signal 30 at a timing which is later than, by a time length T3, the timing where the write data output signal 30 is activated in the case of the write mode signal 7="0". Similarly, since the write mode signal 7="1", the write strobe signal generation unit 310 activates the write strobe signal 20 at a timing which is later than, by the time length T3, the timing where the write strobe signal 20 is activated in the case of the write mode signal 7="0". The write buffer 5 is activated by the write data output signal 30 so as to output the write data to the data bus 10. At a rising edge of the write strobe signal 20, the write data is written to the memory 100.

As shown in FIG. 5, the write data output signal generation unit 301 includes a write data output signal generating circuit 303, a signal delay circuit 305 and a signal selection circuit 320. The write data output signal generating circuit 303 is the same as the write data output signal generating circuit in the "first prior art" shown in FIG. 1, and generates the write data output signal 32, as shown in FIG. 6. The signal delay circuit 305 outputs a data write output signal 51 which is activated at a timing later than, by the time length T3, a timing where the write data output signal 32 is activated. For this purpose, the signal delay circuit 305 includes a D-latch 66 receiving at its data input the write data output signal 32 and at its latch control input the clock signal 4 through an inverter 63. This D-latch 66 latches the write data output signal 32 at a falling edge of each clock signal 4 as shown in FIG. 6, so as to output the latched write data output signal 32 as a latch signal 73. This latch signal 73 and the write data output signal 32 are supplied to an AND circuit 68, which in turn outputs the write data output signal 51, as shown in FIG. 6.

The signal selection circuit 320 includes a tristate buffer 81 receiving the write data output signal 51 and controlled by the write mode signal 7, and another buffer 82 receiving the write data Output signal 32 and controlled by the write mode signal 7 through an inverter 63. Therefore, when the write mode signal 7="0", the write data output signal 32 is outputted from the signal selection circuit 320 as the write data output signal 30. When the write mode signal 7="1", the write data output signal 51 is outputted from the signal selection circuit 320 as the write data output signal 30.

As shown in FIG. 7, the write strobe signal generation unit 310 includes a write strobe signal generating circuit 311, a signal delay circuit 315 and a signal selection circuit 330. The write strobe signal generating circuit 311 generates the write strobe signal 22 as shown in FIG. 8, and the signal delay circuit 315 outputs a write strobe signal 55 which is activated at a timing later than, by the time length T3, a timing where the write strobe signal 22 is activated. The signal delay circuit 315 includes a D-latch 67 receiving at its data input the write strobe signal 22 and at its latch control input the clock signal 4 through an inverter 63. The D-latch 67 latches the write strobe signal 22 at a falling edge of each clock signal 4, so as to output the latched write strobe signal 22 as a latch signal 75 as shown in FIG. 8. This latch signal 75 and the write strobe signal 22 are supplied to a NAND circuit 69, which in turn outputs the write strobe signal 55, as shown in FIG. 8. Accordingly, the signal delay circuit 315 operates substantially similar to that of the signal delay circuit 305 of the write data output signal generation unit 301, excepting that the write strobe signal 22 is a low-active signal. On the other hand, the signal selection circuit 330 is constructed similarly to the signal selection circuit 320 of the write data output signal generation unit 301.

As mentioned above, the first embodiment is so configured as to avoid collision between the read data and the write data, by setting the write mode register 6 to "1" to the effect that the write data output signal 30 and the write strobe signal 20 are activated at a timing later than that of the "first prior art" by the time length T3.

Second Embodiment

Figure 9:
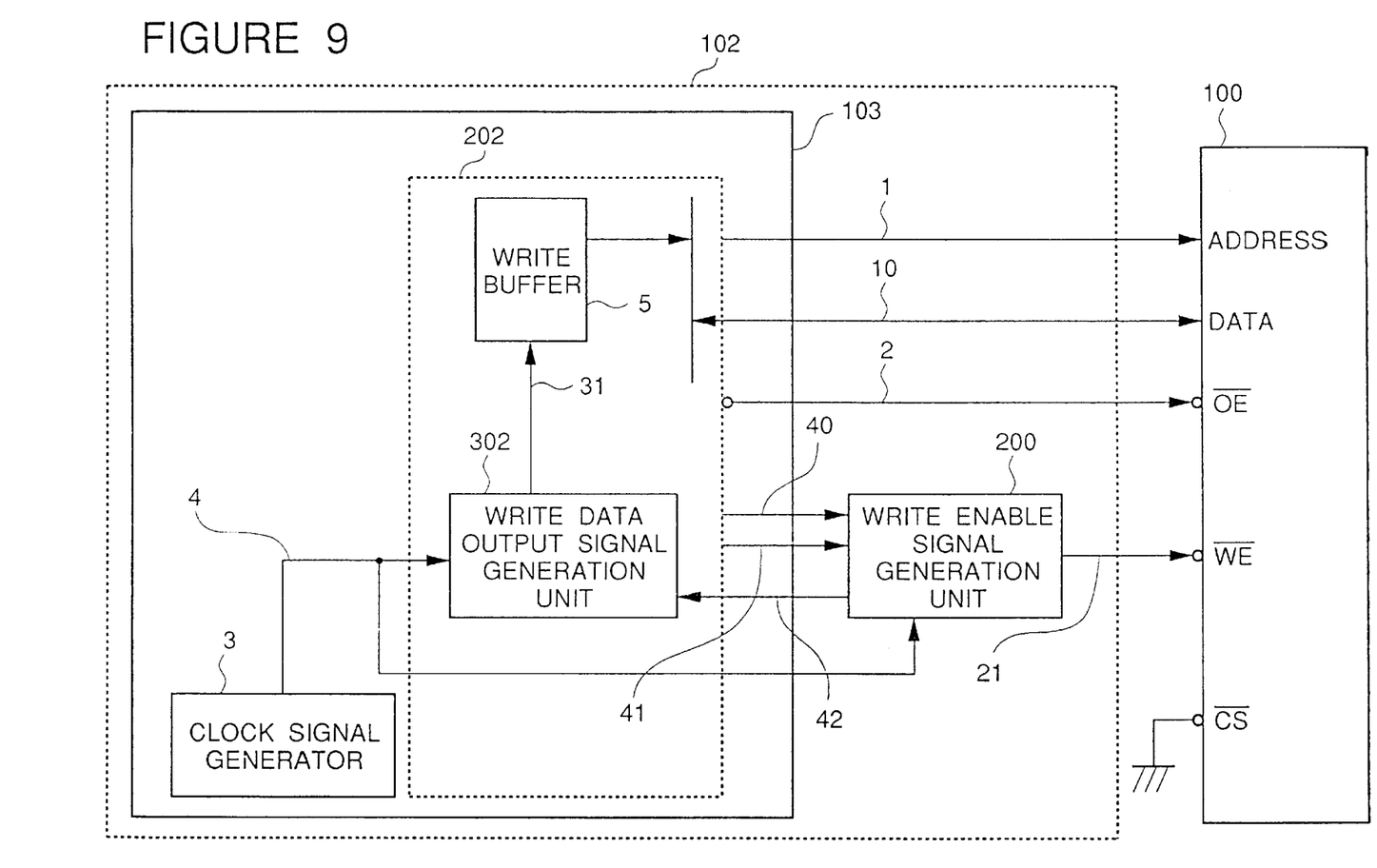
FIG. 9 is a block diagram of a second embodiment of the data processing system in accordance with the present invention.
Figure 10:
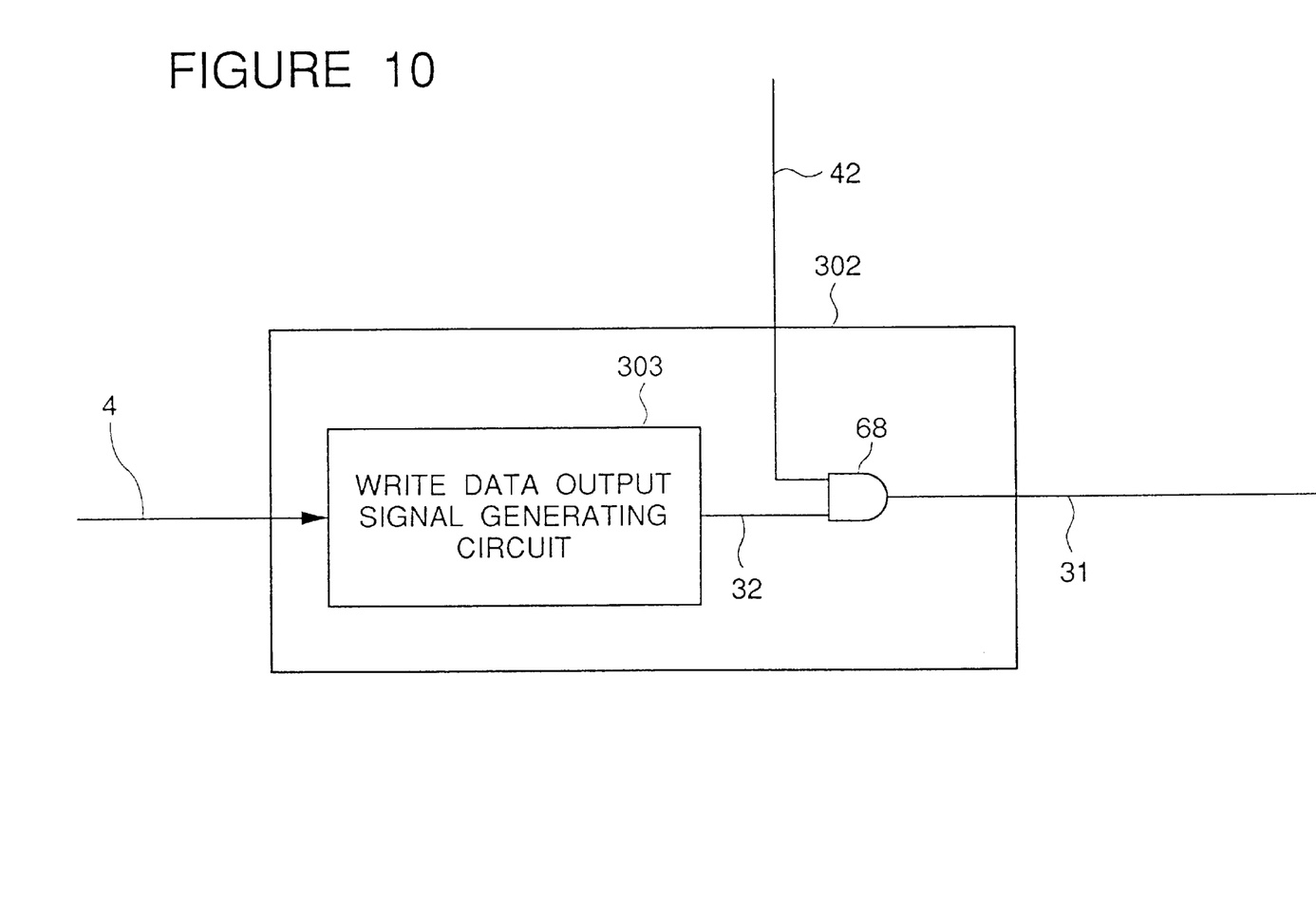
FIG. 10 is a block diagram of the write data output signal generation unit included in the embodiment shown in FIG. 9.
Figure 11:
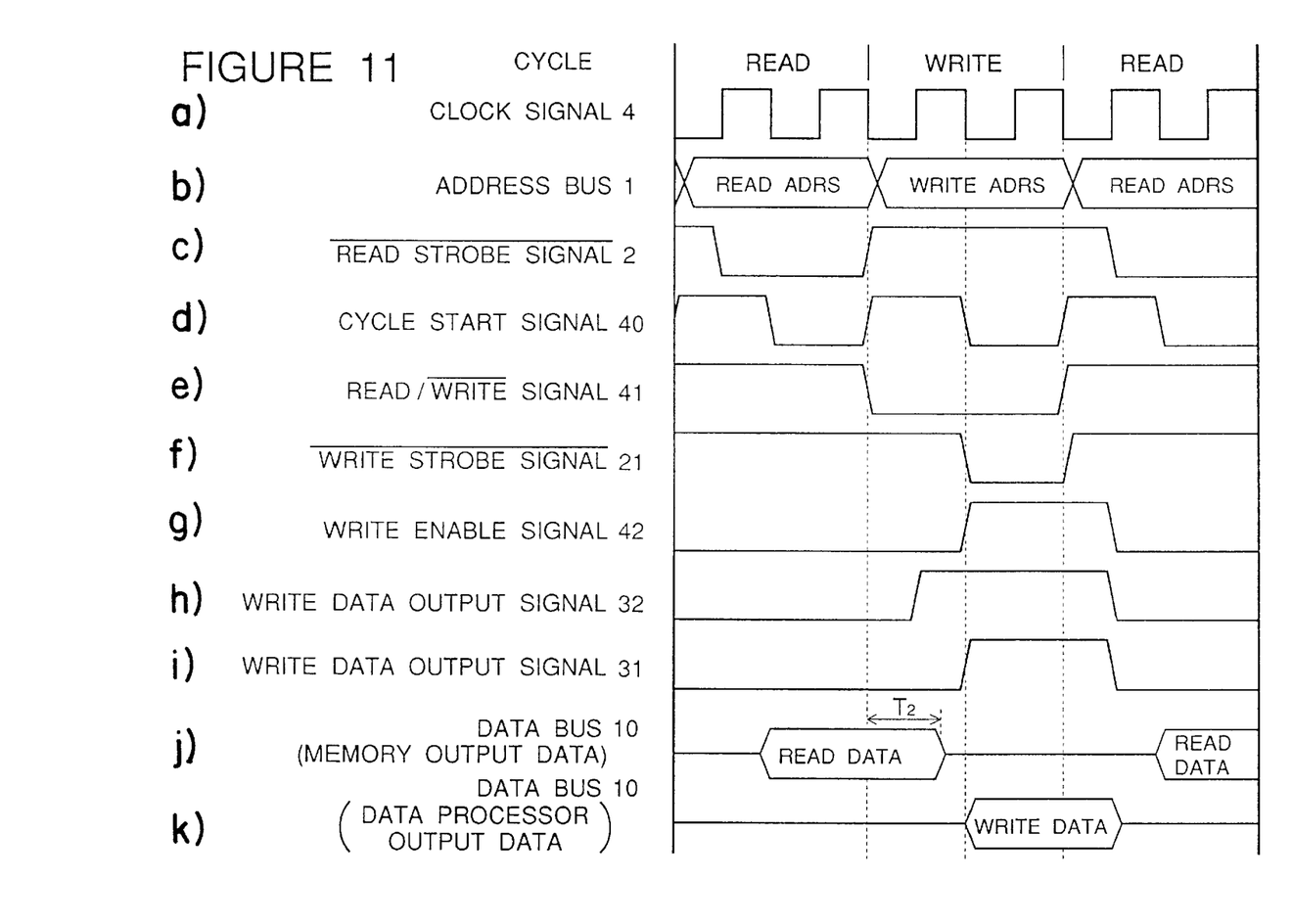
FIG. 11 is a timing chart illustrating operation of the embodiment shown in FIG. 9.
Figure 12:
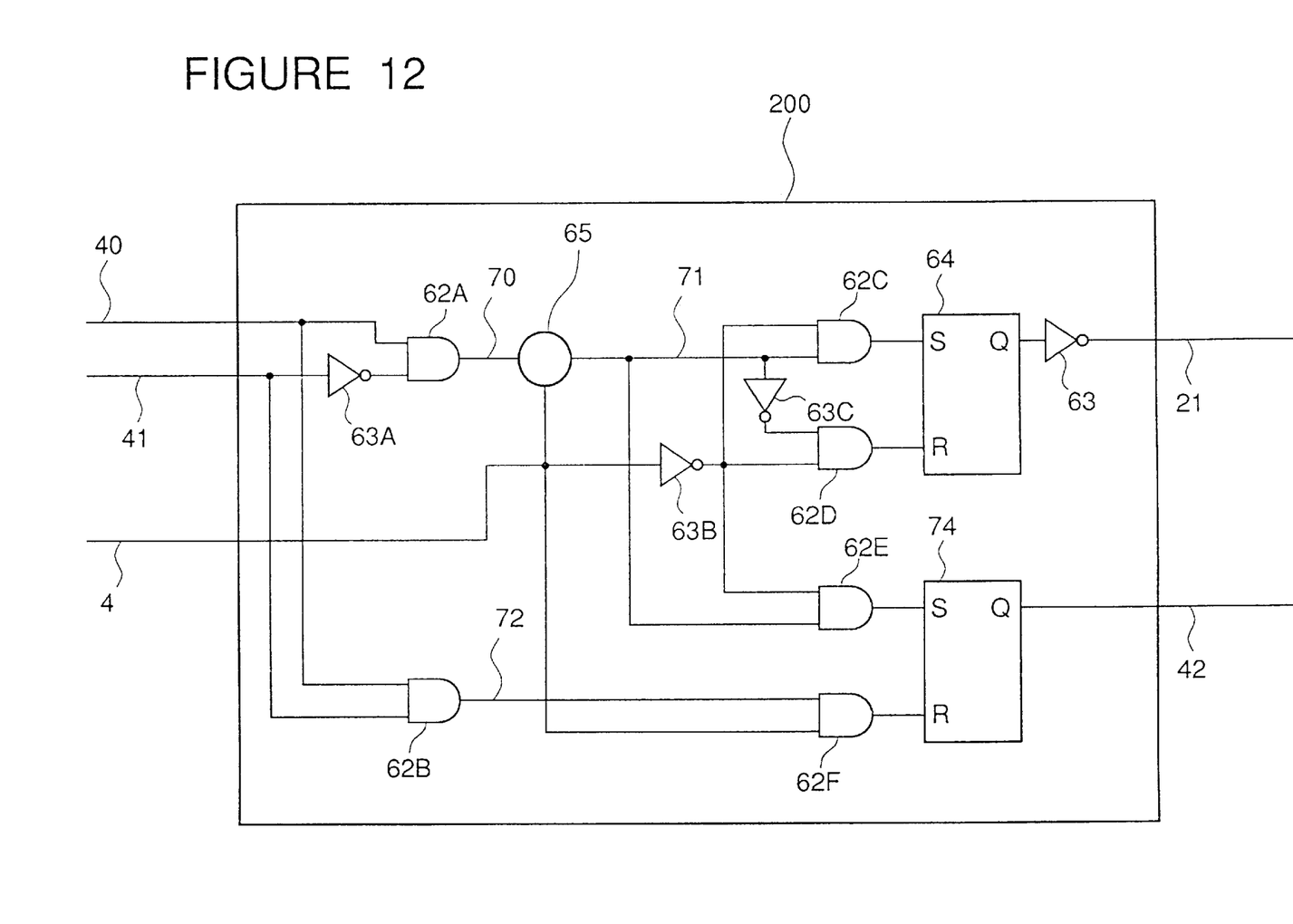
FIG. 12 is a block diagram of the write enable signal generation unit included in the embodiment shown in FIG. 9.
Figure 13:
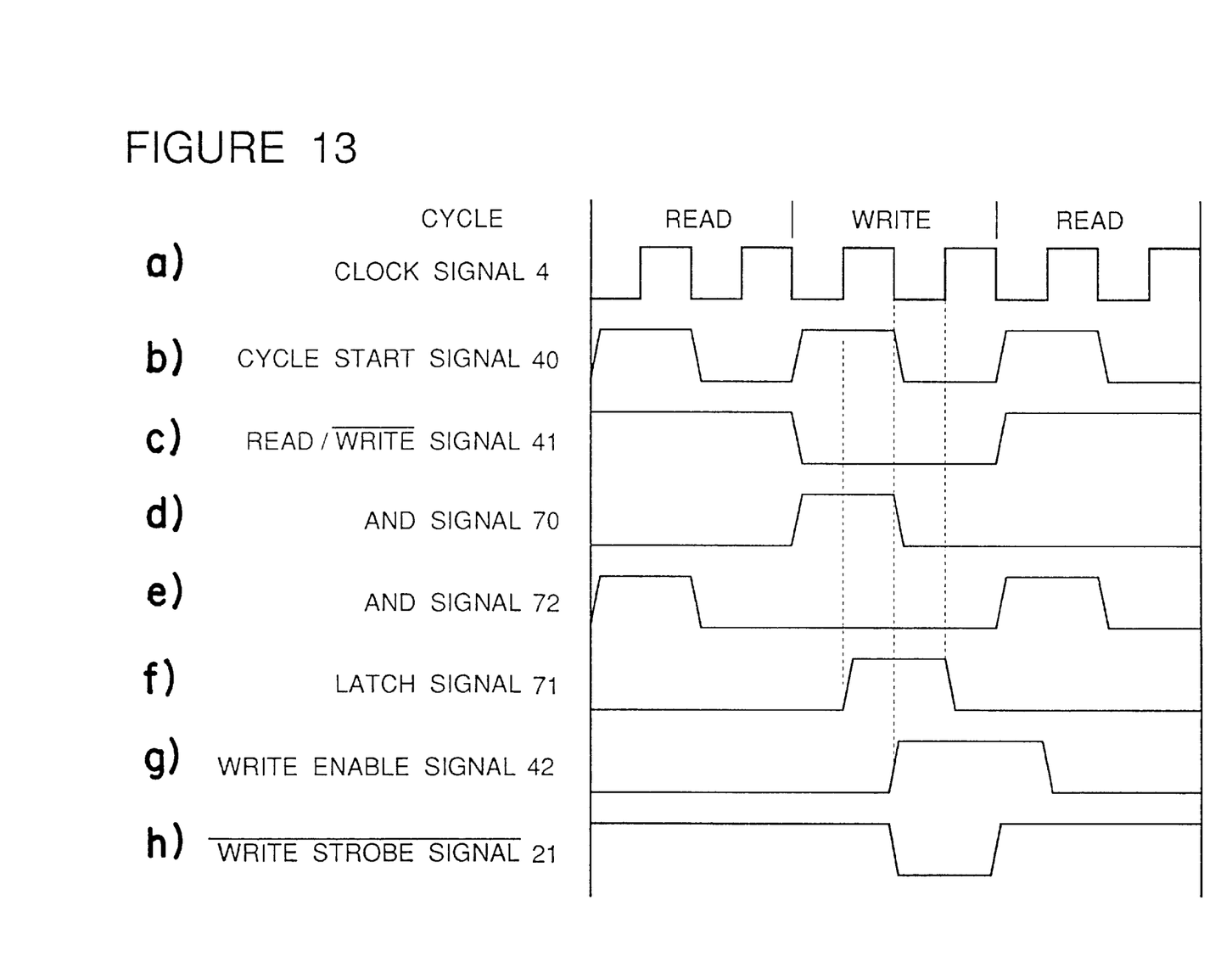
FIG. 13 is a timing chart illustrating operation of the write enable signal generation unit shown in FIG. 12.

Now, a second embodiment of the data processing system in accordance with the present invention will be explained with reference to FIGS. 9 to 13. FIG. 9 is a block diagram of a second embodiment of the data processing system in accordance with the present invention. FIG. 10 is a block diagram of a write data output signal generation unit 302 included in the embodiment shown in FIG. 9. FIG. 11 is a timing chart illustrating operation of the embodiment shown in FIG. 9. FIG. 12 is a block diagram of a write enable signal generation unit 200 included in the embodiment shown in FIG. 9. FIG. 13 is a timing chart illustrating operation of the write enable signal generation unit shown in FIG. 12.

As shown in FIG. 9, a data processing system, generally designated by Reference Numeral 102, includes a bus interface 202, a clock signal generator 3 for supplying a clock signal 4 to the bus interface 202, and is coupled to a memory 100 through an address bus 1 and a data bus 10. The data processing system 102 supplies a read strobe signal 2 and a write strobe signal 21 to the memory 100 for accessing the memory 100. The write strobe signal 21 is generated by a write enable signal generation unit 200 provided externally of a main data processor 103 composed of the bus interface 202 and the clock signal generator 3.

The bus interface 202 includes a write buffer 5 and a write data output signal generation unit 302, and is coupled to the address bus 1 and the data bus 10. In addition, the bus interface 202 supplies the read strobe signal 2 to the memory 100 and outputs a cycle start signal 40 and a read/write signal 41 to the write enable signal generation unit 200. This write enable signal generation unit 200 receives the clock signal 4, the cycle start signal 40 and, the read/write signal 41, and outputs a write enable signal 42 to the write data output signal generation unit 302 of the data processing system 102 and also outputs the write strobe signal 21 to the memory 100.

The write data output signal generation unit 302 outputs to the write buffer 5 the write data output signal 31 which is masked by the write enable signal 42. The clock signal generator 3 generates the clock signal 4, which is supplied to the write data output signal generation unit 302 and write enable signal generation unit 200. The write buffer 5 outputs the write data to the data bus 10 for a period in which the write data output signal 31 generated in the write data output signal generation unit 302 is active.

As shown in FIG. 10, the write data output signal generation unit 302 includes a write data output signal generating circuit 303 and an AND circuit 68. The write data output signal generating circuit 303 is the same as the write data output signal generating circuit of the "first prior art" shown in FIG. 1, and generates the write data output signal 32. The AND circuit 68 receives the write data output signal 32 and the write enable signal 42, and outputs the write data output signal 31.

Now, operation of the second embodiment will be described with reference to FIGS. 10 and 11.

When the data processing system 102 starts the read cycle, the bus interface 202 outputs the read address to the address bus 1, and activates the read strobe signal 2, so that read data is outputted from the memory 100 to the data bus 10. This read data is sampled to the data processing system 102 at a rising edge of the read strobe signal 2.

On the other hand, when the data processing system 102 starts the write cycle, the bus interface 202 outputs the write address to the address bus 1. As shown in FIG. 11, the write enable signal generation unit 200 activates the write enable signal 42 and the write strobe signal 21 on the basis of the cycle start signal 40, the read/write signal 41 and the clock signal 4. On the basis of a logical product of the write data output signal 32 and the write enable signal 42, the write data output signal generation unit 302 outputs the write data output signal 31 to the write buffer 5. During a period in which the write data output signal 31 is active, the write buffer 5 outputs the write data to the data bus 10. At a rising edge of the write strobe signal 21, the write data is written to the memory 100.

As shown in FIG. 12, the write enable signal generation unit 200 receives the cycle start signal 40, the read/write signal 41 and the clock signal 4, and generates the write enable signal 42 and the write strobe signal 21. For this purpose, the write enable signal generation unit 200 is composed of AND circuits 62A–62F, inverters 63A–63C, R-S flipflops 64 and 74, and a level latch 65, connected as shown.

When the cycle start signal 40="1" and the read/write signal 41="0", an output 70 of the AND circuit 62A becomes "1", and the cycle start signal 40="1" and the read/write signal 41="1", an output 72 of the AND circuit 62B becomes "1".

The level latch 65 outputs the output 70 of the AND circuit 62A as a latch signal 71 when the clock signal 4="1". When the clock signal 4="0", the latch 65 holds the value of the latch signal 71 at a falling time of the clock signal 4.

As shown in FIG. 13, the R-S flipflop 64 brings the write strobe signal 21 to "0" when the latch signal 71="1" and the clock signal 4="0", and to "1" when the late signal 71="0" and the clock signal 4="0". The R-S flipflop 74 brings the write enable signal 42 to "1" when the latch signal 71="1" and the clock signal 4="0", and to "0" when the AND output signal 72="1" and the clock signal 4="1"

As mentioned above, the collision between the read data and the write data is avoided by supplying the write enable signal 42 from an external of the data processor 103 so as to delay the output timing of the write data.

As will be apparent from the above, the data processing system in accordance with the present invention includes an output timing adjusting means for delaying an output start timing of write data by a predetermined time length when the data processing system outputs the write data, so that even if a just preceding read data exists on a data bus, the write data is outputted to the data bus after the just preceding read data has disappeared from the data bus. Thus, it is possible to avoid collision between the read data and the write data without providing a special collision preventing means on the data bus and without inserting the halt condition between the read cycle and the write cycle.

The invention has thus been shown and described with reference to the specific embodiments. However, it should be noted that the present invention is in no way limited to the details of the illustrated structures but changes and modifications may be made within the scope of the appended claims.

I claim:

1. A data processing system comprising:

a data processing unit timed with a clock signal to supply an address signal through an address bus to a memory, and to generate a read strobe signal, a cycle start signal and a read/write signal indicative of whether a memory access cycle is a read cycle or a write cycle, so as to read data through a data bus from an address of said memory designated by said address signal during said read cycle and so as to write data through said data bus to an address of said memory designated by said address signal during said write cycle;

a write enable signal generation unit receiving a write mode signal, said cycle start signal, said clock signal and said read/write signal, for generating a write strobe signal and a write enable signal at a delayed timing when said write mode signal is at a first logic level; so as to ensure that write data in the write cycle is outputted to said data bus after an immediately preceding read data is no longer on said data bus, said write strobe signal and said write enable signal being supplied to said memory and said data processing unit, respectively, said write data on said data bus being written to said memory when said write strobe signal supplied to said memory is activated, said write enable signal generation unit outputting said write strobe signal and said write enable signal at a non-delayed timing when said write mode signal is at a second logic level different from said first logic level;

an output delay means for delaying a time to start to output said write data to said data bus in synchronism with the delayed timing of said write enable signal generated in said write enable signal generation unit, said output delay means also delaying activation of said write strobe signal, so that said write strobe signal is activated at a delayed time corresponding with the delayed time to start to output said write data; and a write mode register for storing a data value that corresponds to one of said first logic level and said second logic level of said write mode signal, said write mode signal being continuously output from said write mode register and having a logic level in accordance with said stored data value, wherein the delayed write data is supplied through said data bus to said physically external device and the delayed write strobe signal is supplied to said physically external device when said write mode signal is at said first logic level, and wherein the undelayed write data is supplied through said data bus to said physically external device and the undelayed write strobe signal is supplied to said physically external device when said write mode signal is at said second logic level, and wherein the delayed write strobe signal prevents collision between said read data and said write data when said read data is read from said physically external device and then said write data is written into said physically external device, and wherein the write data is outputted to said data bus during a first memory address cycle that occurs immediately after a second memory address cycle during which said read data is started to be output to said data bus, and wherein, if said read data is still on said data bus during said first memory address cycle, said delayed write strobe signal is output instead of said undelayed write strobe signal in order to delay the writing of said write data into said physically external device via said data bus until after said read data no longer is on said data bus.

2. A data processing system comprising:

a clock circuit configured to output a clock signal;

a data bus;

an address bus;

a memory;

a data processing unit connected to said clock circuit and configured to be timed with said clock signal, said data processing unit configured to supply an address signal through said address bus to said memory, to supply a read strobe signal to said memory to enable reading of read data through said data bus from an address of said memory designated by said address signal, and to supply a write strobe signal to said memory to enable writing of write data through said data bus to an address of said memory designated by said address signal; and a bus interface coupled between said data processing unit and said memory and having means for receiving a write mode signal and for delaying a time to start output of said write data to said data bus when said read strobe signal has been supplied by said data processing unit within a first predetermined time before said write strobe signal has been supplied by said data processing unit in accordance with said write mode signal being at a first logic level, and for not delaying a time to start output of said write data to said data bus when said read strobe signal has been supplied by said data processing unit within the first predetermined time before said write strobe signal has been supplied by said data processing unit in accordance with said write mode signal being at a second logic level, said bus interface also having means for delaying activation of said write strobe signal, so that said write strobe signal is activated at a delayed time corresponding with the delayed time to start to output said write data when said write mode signal is at said first logic level, wherein the delayed write data is supplied through said data bus to said physically external device and the delayed write strobe signal is supplied to said physically external device when said write mode signal is at said first logic level, and wherein the non-delayed write data is supplied through said data bus to said physically external device and the non-delayed write strobe signal is supplied to said physically external device when said write mode signal is at said second logic level, and wherein the delayed write strobe signal prevents collision between said read data and said write data when said read data is read from said physically external device and then said write data is written into said physically external device, and wherein the write data is outputted to said data bus during a first memory address cycle that occurs immediately after a second memory address cycle during which said read data is started to be output to said data bus, and wherein, if said read data is still on said data bus during said first memory address cycle, said delayed write strobe signal is output instead of said undelayed write strobe signal in order to delay the writing of said write data into said physically external device via said data bus until after said read data no longer is on said data bus.

* * * * *